United States Patent

Schroderus

[11] Patent Number: 5,983,072
[45] Date of Patent: Nov. 9, 1999

[54] ESTABLISHING A TELECOMMUNICATIONS CONNECTION IN A MOBILE COMMUNICATION SYSTEM

[75] Inventor: Osmo Schroderus, Sumiainen, Finland

[73] Assignee: Nokia Telecommunications Oy, Espoo, Finland

[21] Appl. No.: 08/817,073

[22] PCT Filed: Oct. 5, 1995

[86] PCT No.: PCT/FI95/00552

§ 371 Date: Apr. 4, 1997

§ 102(e) Date: Apr. 4, 1997

[87] PCT Pub. No.: WO96/11554

PCT Pub. Date: Apr. 18, 1996

[30] Foreign Application Priority Data

Oct. 6, 1994 [FI] Finland ................................ 944682

[51] Int. Cl.[6] .................................................. H04B 7/26
[52] U.S. Cl. ....................... 455/11.1; 455/509; 455/516
[58] Field of Search ............................. 455/11.1, 15, 17, 455/422, 507, 509, 510, 515, 516, 517, 518, 519; 370/347

[56] References Cited

U.S. PATENT DOCUMENTS

| | | | |
|---|---|---|---|
| 4,534,061 | 8/1985 | Ulug | 455/17 |
| 5,423,055 | 6/1995 | Diaz et al. | 455/17 |
| 5,515,366 | 5/1996 | Chien et al. | 370/347 |
| 5,781,860 | 7/1998 | Lopponen et al. | 455/11.1 |

FOREIGN PATENT DOCUMENTS

| | | |
|---|---|---|
| 94/11957 | 5/1994 | WIPO . |
| 95/12956 | 5/1995 | WIPO . |
| 95/24655 | 9/1995 | WIPO . |

*Primary Examiner*—Thanh Cong Le
*Attorney, Agent, or Firm*—Pillsbury Madison & Sutro LLP

[57] ABSTRACT

A method, a mobile communication system and a mobile station for establishing a telecommunication connection on a direct mode channel and for improving radio coverage by way of using a simple and cheap repeater. An inexpensive and simple repeater is achieved by, instead of using two transceivers, using two receivers and just one transmitter. A mobile station, prepared for direct mode communication, is able to switch between channels answering to commands sent from the repeater.

16 Claims, 7 Drawing Sheets

ESTABLISHING A TELECOMMUNICATIONS CONNECTION IN A MOBILE COMMUNICATION SYSTEM

FIELD OF THE INVENTION

The invention relates to a method, a mobile communication system and a mobile station for establishing a telecommunications connection in a mobile communication system comprising at least one base station, mobile stations communicating with the base station at the uplink and downlink frequencies of its control and traffic channels; at least a first and a second mobile station communicating on a direct mode channel that comprises uplink and downlink channels; a repeater station that relays traffic between the mobile stations communicating on the direct mode channel and the base station; and in the method, the repeater station listening to the downlink frequency of the control channel of the base station and the uplink channel of the direct mode channel.

BACKGROUND OF THE INVENTION

The invention relates to radio telecommunications systems. A subscriber of a radio telecommunications system, i.e. a subscriber station, such as a mobile phone or some other means of communication, may be registered in a radio network or radio system through control or traffic channels maintained by the base stations of the radio network.

Apart from system channels of radio telecommunications systems, direct mode channels can also be used, i.e. direct mode operation is applied. Subscriber stations using direct mode operation do not communicate directly with a radio network or its base stations. Direct mode channels are frequencies at which the mobile phones or other means of communication are able to communicate directly with one another without the system.

Direct mode channels are typically used in situations where, e.g., a group of hand-held mobile phones communicate with one another at such a long distance from the base station that system channels cannot be used.

Another important use of direct mode channels is in the addition of capacity when traffic increases rapidly in one part of the service area of the system, e.g. at one point of the radio network.

A direct mode channel is also called a direct or simplex channel, or a simplex connection. A direct mode channel is a channel that is typically not used by the system at all. It may be, for example, a channel with the same channel spacing as the channels of the system, e.g. 12.5 kHz or 25 kHz. Further, especially a direct mode channel used for repetition may be a pair of frequencies comprising uplink and downlink frequencies, or in a time division multiple access system (TDMA), uplink and downlink channels. Of the mobile phones operating on the direct mode channel, the transmitting station has then tuned its transmitter to the channel and transmits speech or data information. The other mobile phones set to direct mode operation have tuned their receivers to the same channel.

On a direct mode channel, both analog modulation and digital modulation can be used. A mobile phone transmitting on the channel can also send signalling information, such as information about access rights and priorities or a group operating on the channel, or data traffic. On a direct mode channel, messages can be encrypted, or signals can be transmitted in clear form.

Subscriber stations operating in direct mode communicate with other subscriber stations on a direct mode channel, without necessarily being in direct contact with the base stations of the radio network. Subscriber stations operating in direct mode can, however, communicate with the radio network through repeater stations. A repeater station is an equipment in which two radio units are interconnected. A repeater station typically comprises two transceivers, one of which operates in the downlink direction and the other in the uplink direction. A repeater station transmits the information messages sent on the direct mode channel to the desired network elements, such as the base stations of the radio network, which forward the information messages to the mobile exchanges of the radio network. The information messages transmitted by the repeater station may be, e.g., data or signalling messages. With a repeater, e.g. semiduplex communication is used on a direct mode channel.

A problem with the solutions of the prior art is how to implement a reliable mobile communication system comprising a repeater that is cheaper to use and does not involve great equipment costs.

Another problem with the prior art solutions is how to provide a repeater and an operating method by which a repeater that is as simple as possible operates effectively, repeating and relaying information between the base station of the mobile communication system and the mobile stations that communicate or have been located on a direct mode channel.

SUMMARY OF THE INVENTION

The object of the present invention is to provide a method, a mobile communication system and a mobile station for establishing a telecommunications connection in a mobile communication system such that a repeater forwarding/relaying traffic between the mobile stations communicating on a direct mode channel and the base station of the mobile communication system can be implemented as economically as possible.

Another object of the present invention is to provide a method, a mobile communication system and a mobile station for establishing a telecommunications connection in a mobile communication system such that the communication between the mobile stations communicating on a direct mode channel and the base station of the mobile communication system is made possible with a repeater that is as inexpensive and simple as possible.

This new type of method for establishing a telecommunications connection is achieved with a method of the invention, which is characterized by the steps of a first mobile station sending a call set-up request to the repeater station on the uplink channel of the direct mode channel; the repeater station transmitting the call set-up request to the base station; and in response to the call set-up request, the repeater station being commanded to move to a desired traffic channel; the repeater station using the downlink channel of the direct mode channel to command the mobile stations communicating on the direct mode channel to switch over to the uplink frequency of the direct mode channel and start listening to it, and moving itself to the downlink frequency of the traffic channel, starting to listen to it; in response to the command of the repeater station, the first and second mobile stations storing the information about the traffic channel in their memories and moving to the uplink channel of the direct mode channel for sending a transmission to the repeater station and to the uplink frequency of the traffic channel for listening to the transmissions forwarded by the repeater station; the repeater station forwarding the transmission received from the base station to the first and second mobile stations at the uplink frequency of the traffic channel; the repeater station using the uplink frequency of the traffic channel to forward the transmissions transmitted by the first and second mobile stations on the direct mode channel to the base station and to the mobile stations listening to the uplink frequency of the traffic channel.

The invention also relates to a method for establishing a telecommunications connection in a mobile communication system comprising at least one base station, mobile stations communicating with the base station at the uplink and downlink frequencies of its control and traffic channels; at least a first and a second mobile station communicating on a direct mode channel that comprises uplink and downlink channels; a repeater station relaying traffic between the mobile stations communicating on the direct mode channel and the base station; and in the method, the repeater station listening to the downlink frequency of the control channel of the base station and the uplink channel of the direct mode channel.

The method of the invention is characterized by the steps of the base station sending a call set-up request to the repeater station, requesting at least a first mobile station to participate in the call to be established and notifying the repeater station of the traffic channel allocated for the call; the repeater station using the downlink channel of the direct mode channel to command the mobile stations communicating on the direct mode channel to switch over to the uplink frequency of the traffic channel and start listening to it, and moving itself to the downlink frequency of the traffic channel, starting to listen to it; in response to the command of the repeater station, the first and second mobile stations storing the information about the traffic channel in their memories and switching over to the uplink channel of the direct mode channel for sending a transmission to the repeater station and to the uplink frequency of the traffic channel for listening to the transmissions forwarded by the repeater station; the repeater station forwarding the transmission received from the base station to the first and second mobile stations at the uplink frequency of the traffic channel allocated; the repeater station using the uplink frequency of the traffic channel to forward the transmissions transmitted by the first and second mobile stations on the direct mode channel to the base station and to the mobile stations listening to the uplink frequency of the traffic channel.

The invention also relates to a mobile communication system comprising at least one base station with control and traffic channels comprising uplink and downlink frequencies; at least a first and a second mobile station communicating on a direct mode channel that comprises uplink and downlink channels; a repeater station for relaying traffic between the mobile stations communicating on the direct mode channel and the base station; and the repeater station comprising: a first receiver unit for receiving radio messages from the base station; a second receiver unit for receiving radio messages from mobile stations communicating on the uplink frequency of the direct mode channel; a control unit for controlling the operation of the receiver units and the repeater station.

The inventive mobile communication system is further characterized in that the repeater station further comprises a single transmitter unit for transmitting radio messages in response to the commands of the control unit, either to the base station and a mobile station listening to the uplink frequency of the base station, or to a mobile station communicating on a direct mode channel.

The invention also relates to a mobile station communicating on a direct mode channel, comprising: a memory means, a transceiver, and a controller for controlling the operation of the mobile station.

The inventive mobile station is characterized by comprising means, which are responsive to the command sent by the repeater station, for moving the transceiver of the mobile station to the uplink frequency of the traffic channel mentioned in the command of the repeater station, the uplink frequency being transmitted by the repeater station.

The invention is based on the idea of providing a repeater station with one transmitter unit and two receiver units. This provides a simpler and more economical structure for a repeater station.

The invention is further based on the idea that when operating in accordance with the method of the invention, the repeater station sends a command on the downlink channel of the direct mode channel, instructing the mobile stations communicating on the direct mode channel to switch over to the uplink frequency of a desired traffic channel and start listening to it. The repeater station simultaneously tunes its receiver to the downlink frequency of the traffic channel, which is being transmitted by the base station of the mobile communication system. The mobile stations move to the desired uplink frequency of the traffic channel for listening to the transmissions forwarded by the repeater station, and to the uplink channel of the direct mode channel for transmission. The repeater station thereby forwards the transmission received from the base station to the mobile stations at the uplink frequency of the traffic channel. Correspondingly, the repeater station uses the uplink frequency of the traffic channel to forward the transmissions sent by the mobile stations on the direct mode channel to the base station and to the mobile stations listening to the uplink frequency of the traffic channel.

The advantage of the method and the mobile communication system of the invention is that only one transmitter is needed in the repeater of the invention as compared with the two transmitters used in the earlier solutions. If the repeater station were implemented in accordance with the prior art such that traffic channel and direct mode channel frequencies of the system were used simultaneously, two transmitter/receiver pairs operating in the duplex mode would be needed. This is not the case in the present invention, since here only one transmitter unit is needed in the repeater station.

BRIEF DESCRIPTION OF THE DRAWINGS

In the following, the invention will be described in greater detail with reference to the attached drawings, in which.

DETAILED DESCRIPTION PREFERRED EMBODIMENTS OF THE INVENTION

Figure 1:
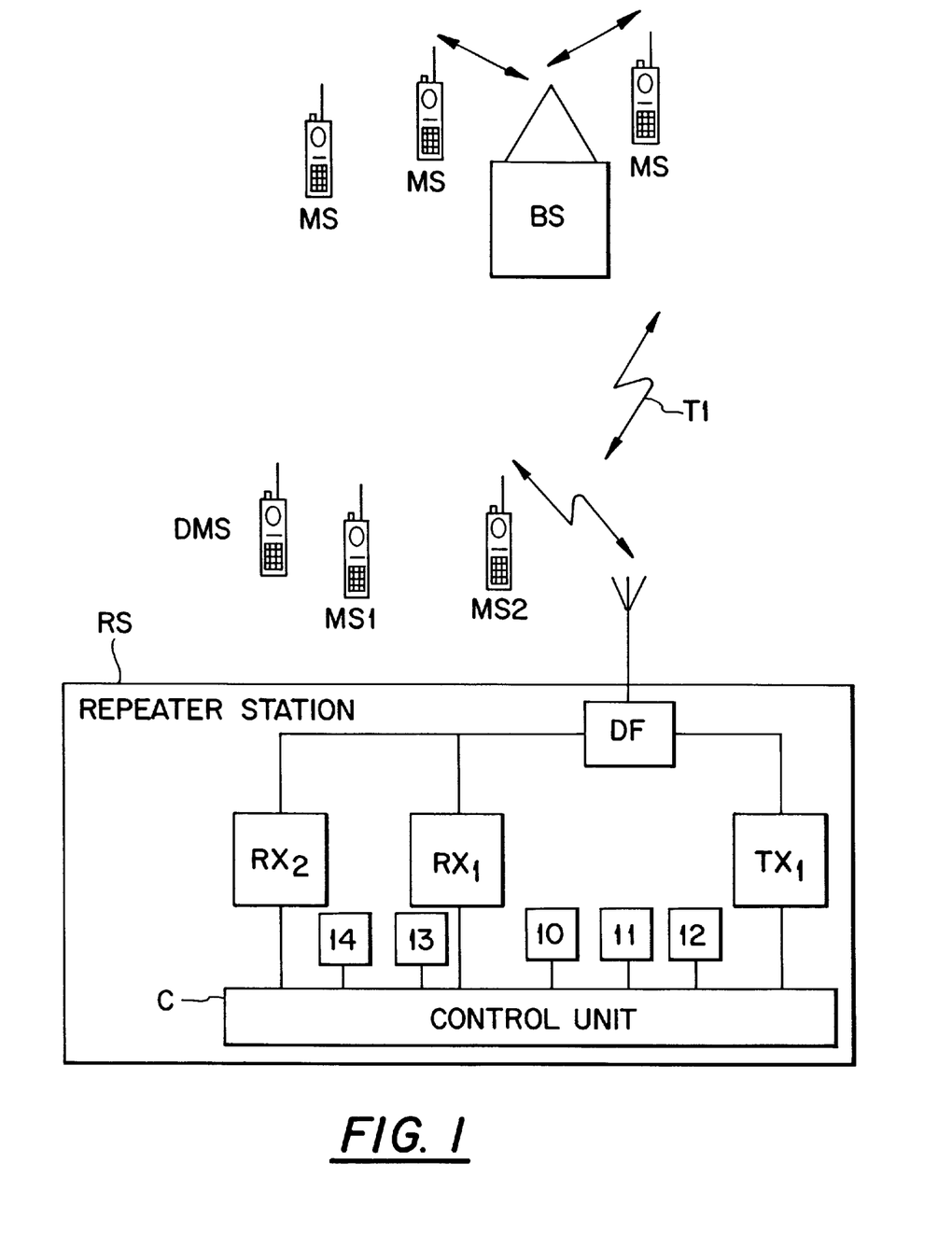
FIG. 1 is a block diagram of a repeater station according to the invention.

FIG. 1 is a block diagram of a repeater station according to the invention. The repeater station according to the invention is used locally both for extending the range of the radio system beyond the coverage area of the base stations, and for amplifying the transmissions from the mobile phones that operate on the direct mode channels in the traffic between them.

The principle structure of a repeater station is shown in FIG. 1. The radio comprises receivers $RX_1$, $RX_2$, a transmitter $TX_1$, a duplex filter DF, and a controller C. The controller C is used for controlling the operation of the receivers and the transmitter and routing the received audio signals and the audio signals to be transmitted.

A repeater station according to the invention relates to the mobile communication system as a whole, the system comprising: at least one base station BS having control channels and traffic channels comprising uplink and downlink frequencies. The mobile communication system also comprises at least a first MS1 and a second MS2 mobile station communicating on a direct mode channel comprising uplink and downlink channels. The mobile communication system also comprises a repeater station RS for transmitting traffic T1 between the mobile stations MS1, MS2, DMS communicating on the direct mode channel, and the base station BS. The repeater station RS of the inventive mobile communication system thus comprises: a first receiver unit $RX_1$ for receiving radio messages from the base station BS, a second receiver unit $RX_2$ for receiving radio messages from mobile stations communicating on the uplink channel of the direct mode channel, and a control unit C for controlling the operation of the receiver units and the repeater station. A repeater station of the inventive mobile communication system further comprises a single transmitter unit $TX_1$ for transmitting radio messages in response to the commands of the control unit C either to at least the base station BS and the mobile station MS2 listening to the uplink frequency of the base station or to the mobile station MS1 communicating on the direct mode channel.

The repeater station RS of the inventive mobile communication system further comprises means 10 for forwarding a call set-up message transmitted by the mobile station MS1 communicating on the direct mode channel to the base station BS, and in response to the call set-up message, the repeater station RS is instructed to move to a desired traffic channel.

The inventive repeater station RS of the mobile communication system further comprises means 11 for commanding the mobile stations communicating on the direct mode channel to switch over to the uplink frequency of a desired traffic channel to listen to the transmissions from the repeater station, and means 12 for moving the repeater station to the downlink frequency of a desired traffic channel to listen to it. The repeater station RS of the inventive mobile communication system further comprises means 13 for moving the repeater station RS to the uplink channel of the direct mode channel to listen to it, and means 14 for moving the repeater station RS either to at least the downlink channel of the direct mode channel or to the uplink frequency of the traffic channel for transmission, so as to send a downlink transmission of the traffic channel as an uplink transmission of the traffic channel, and to combine the transmission received from the uplink channel of the direct mode channel with the uplink transmission of the traffic channel sent by the repeater station RS.

Figure 2:
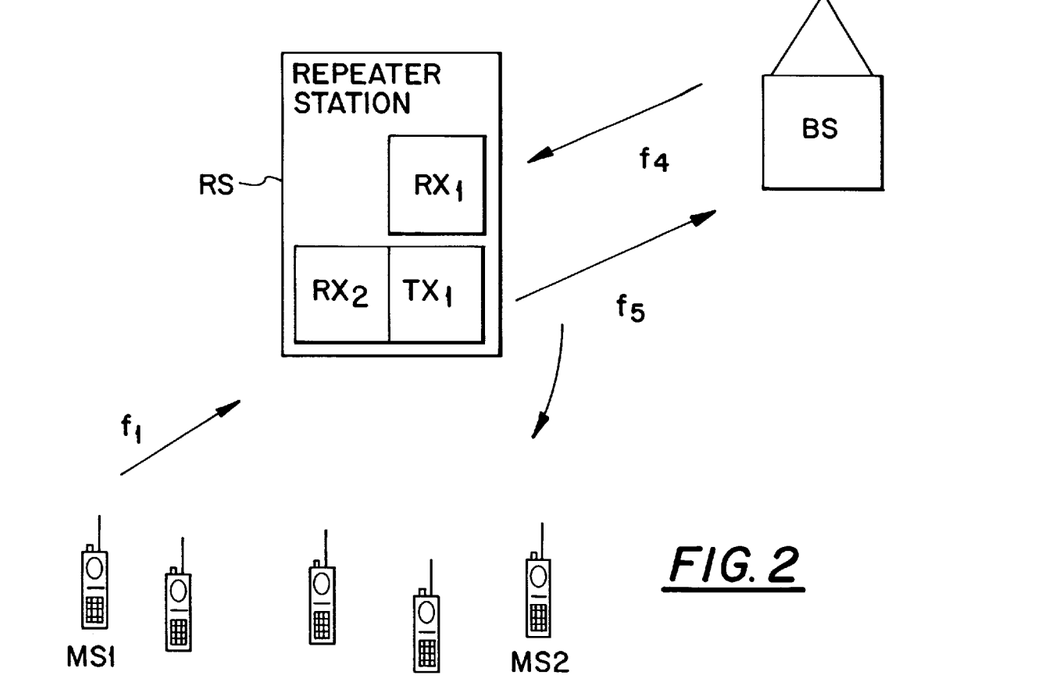
FIG. 2 is a functional diagram of a method according to a first embodiment of the invention in the uplink direction.

FIG. 2 is a functional diagram of a method according to a first embodiment of the invention in the uplink direction, i.e. of call set-up from a direct mode channel to a system channel. When a user located on a direct mode channel establishes a call to a system channel, the operation and the use of the frequencies are as shown in FIG. 2.

A repeater station listens to a control channel of the system, frequency $f_4$, and a channel of the direct mode channel, e.g. frequency $f_1$. The transmitting hand-held mobile phone, or mobile station MS1, transmits on the uplink channel of the direct mode channel, e.g. at frequency $f_1$, or in a time slot corresponding to that channel. The repeater station receives a command from the mobile station to set up a call to the system. The repeater station establishes the call required, using normal signalling associated with call set-up. As the call set-up has been successfully completed, the system commands via a base station BS the repeater station to switch over to the traffic channel desired. Having received the command, the repeater station uses frequency $f_2$ to notify the mobile stations located on the direct mode channel of the traffic channel allocated for the call, and switches itself to frequency $f_6$ of the traffic channel, starting to listen to it.

The hand-held mobile phones, or mobile stations MS1, MS2, store the information about the traffic channel used in their own memories and switch over to uplink frequency $f_5$ of the traffic channel, starting to listen to it. When the mobile stations MS1, MS2 know the traffic channel used, they add the information about the traffic channel to their own transmissions, so that any new mobile stations entering frequency $f_1$ are also able to listen to transmissions sent through the repeater RS.

The repeater station RS forwards the transmission received from frequency $f_1$ to a traffic channel of the system at frequency $f_5$ and listens to frequency $f_6$ of the traffic channel.

Figure 3:
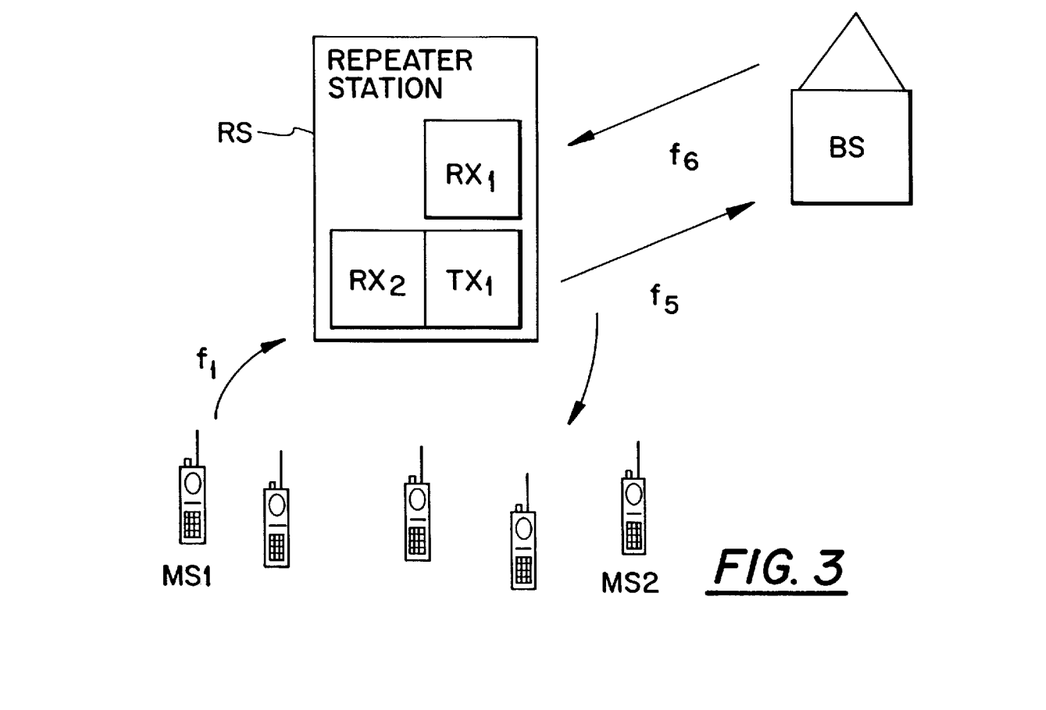
FIG. 3 is a functional diagram of a method according to a second embodiment of the invention in the downlink direction.

FIG. 3 is a functional diagram of a method according to a second embodiment of the invention in the downlink direction. FIG. 3 shows how the method of the invention functions in a situation where a call is established from a system channel to a direct mode channel. The repeater station RS is first in idle mode and listens to the control channel of the system, frequency $f_4$, which is transmitted by the base station BS of the mobile communication system, and to uplink channel $f_1$ of the direct mode channel. The repeater station receives a call set-up message from the system, knowing it to also concern the mobile stations located on the direct mode channel. The repeater station responds to the received call set-up message, using normal call set-up signalling. As the call set-up has been successfully completed, the system commands the repeater station to switch over to the traffic channel. Having received the command, the repeater station uses frequency $f_2$ to notify the mobile stations located on the direct mode channel of the channel allocated for the call, and moves to frequency $f_6$ of the traffic channel, starting to listen to it.

The mobile stations store the information about the traffic channel used and switch over to uplink frequency $f_5$ of the channel concerned to listen to it. When the mobile stations know the traffic channel used, they always include it in their own transmissions, so that any new mobile stations entering frequency $f_1$ are also able to listen to transmissions sent through the repeater.

The repeater station forwards, or sends, the transmission received at frequency $f_6$ from the base station of the system back to the traffic channel, to frequency $f_5$, adding its own identifier to the transmission. On the basis of the identifier, the system knows that the transmission received from the traffic channel is coming from the repeater station, and thereby rejects the transmission instead of forwarding it.

The following is a description of a situation where there is either a pause in the speech item, or the call is terminated. When a speech item or a call is terminated, a traffic channel of the system becomes available. The last piece of information given by the repeater station at frequency $f_5$ of the traffic channel is that the channel is about to expire and that the mobile stations will have to return to frequencies $f_1/f_2$ of the direct mode channel to listen to them. After this, the repeater station will return to idle mode, listening to the control channel of the system and to the direct mode channel.

Figure 4:
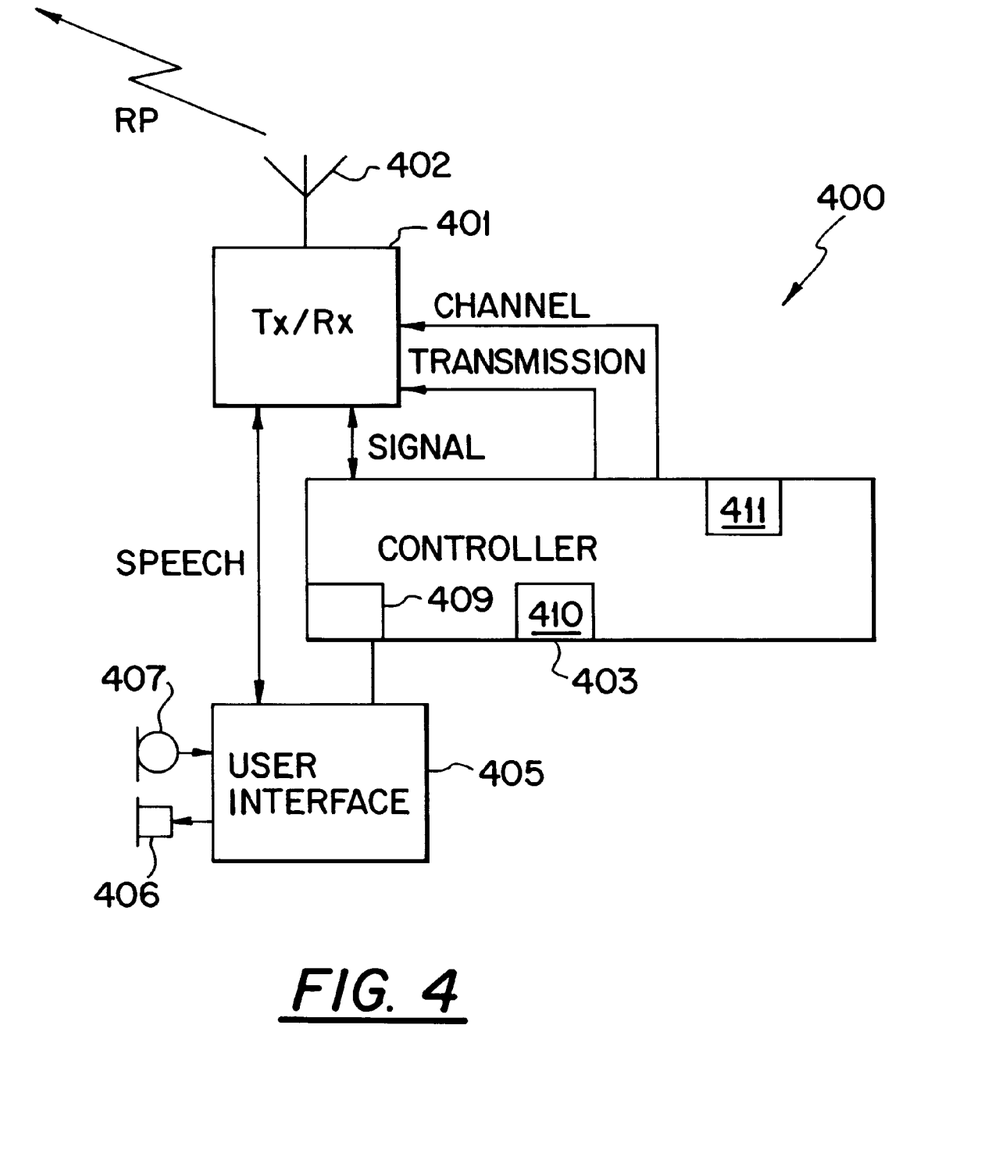
FIG. 4 is a block diagram of a mobile station according to the invention communicating on a direct mode channel, FIGS. 5A and 5B, respectively, are a signalling diagram and a functional diagram of a method according to a first embodiment of the invention in the uplink direction, and FIGS. 6A and 6B, respectively, are a signalling diagram and a functional diagram of a method according to a second embodiment of the invention in the downlink direction.

FIG. 4 is a block diagram of a mobile station of the invention communicating on a direct mode channel. FIG. 4 shows a typical radio unit 400 communicating on a direct mode channel, i.e. a mobile phone, mobile station or, e.g., a subscriber station used by the subscriber. The function of a transceiver (TX/RX) 401 is to tune to the channel used. To the transceiver 401 is connected an antenna 402, which is connected to the radio path RP. Usually, radio frequencies in the range of 60 to 1000 MHz (VHF and UHF ranges) are used, but other frequencies are also possible. On the radio path RP, analogue modulation can be used, the modulation then being usually phase modulation. Other kinds of modulation can also be used. Signalling can be transmitted, e.g. by a voice-frequency subcarrier wave (FFSK). Transmission over a radio path can also be digital. The radio unit may tune to and communicate at the uplink and downlink frequencies of the direct mode channel.

A user interface 405 comprises electroacoustic transducers, typically a headphone 406 and a microphone 407, and optionally buttons for starting and ending a call, and for dialling. Since in a trunking system, and especially on a direct mode channel, transmission over a radio path RP is advantageously unidirectional, the subscriber station usually also has a push-to-talk button that must be depressed for the duration of the speech item. The push-to-talk button is not shown in FIG. 4.

The function of a controller 403 is to control the operation of the radio unit. The controller 403 is connected to the user interface 405, from which it receives signals e.g. for starting and ending a call. The controller 403 may also give the user, via the user interface 405, acoustic or visual signals that relate to the operation of the mobile phone and/or the mobile telephone system.

The controller 403 is connected to the transceiver TX/RX 401. The channel used by the transceiver is allocated by the controller 403, i.e. the transceiver 401 tunes to the channel, i.e. radio frequency and a suitable time slot, allocated by the controller 403. The radio unit of the invention is able to tune to the direct mode channel, and to its uplink and downlink channels and frequencies. The transceiver 401 is also activated by the controller 403. The controller 403 receives and transmits signalling messages through the transceiver 401. A radio unit, or mobile station 400, of the invention communicating on a direct mode channel can be used, e.g. in a radio system that comprises a radio network with at least one base station and mobile stations and one or more repeater stations that relay transmit traffic between the at least one base station and the subscriber stations communicating on the direct mode channel. The mobile station communicating on the direct mode channel here comprises a memory means 411, a transceiver 401, and a controller 403 for controlling the operation of the mobile station.

The inventive mobile station comprises means 409, which are responsive to the command of the repeater station, for moving the transceiver 401 of the mobile station to the uplink frequency of the traffic channel mentioned in the command of the repeater station (FIGS. 1, 2, 3; RS), the uplink frequency being transmitted by the repeater station.

The inventive mobile station further comprises means 410 for including the information about the traffic channel in the transmission of the mobile station 400. In response to the transmission and the information contained therein, any third mobile stations later tuning to the uplink frequency of the direct mode channel switch over to the uplink frequency of the traffic channel, starting to listen to it.

Figure 5A:
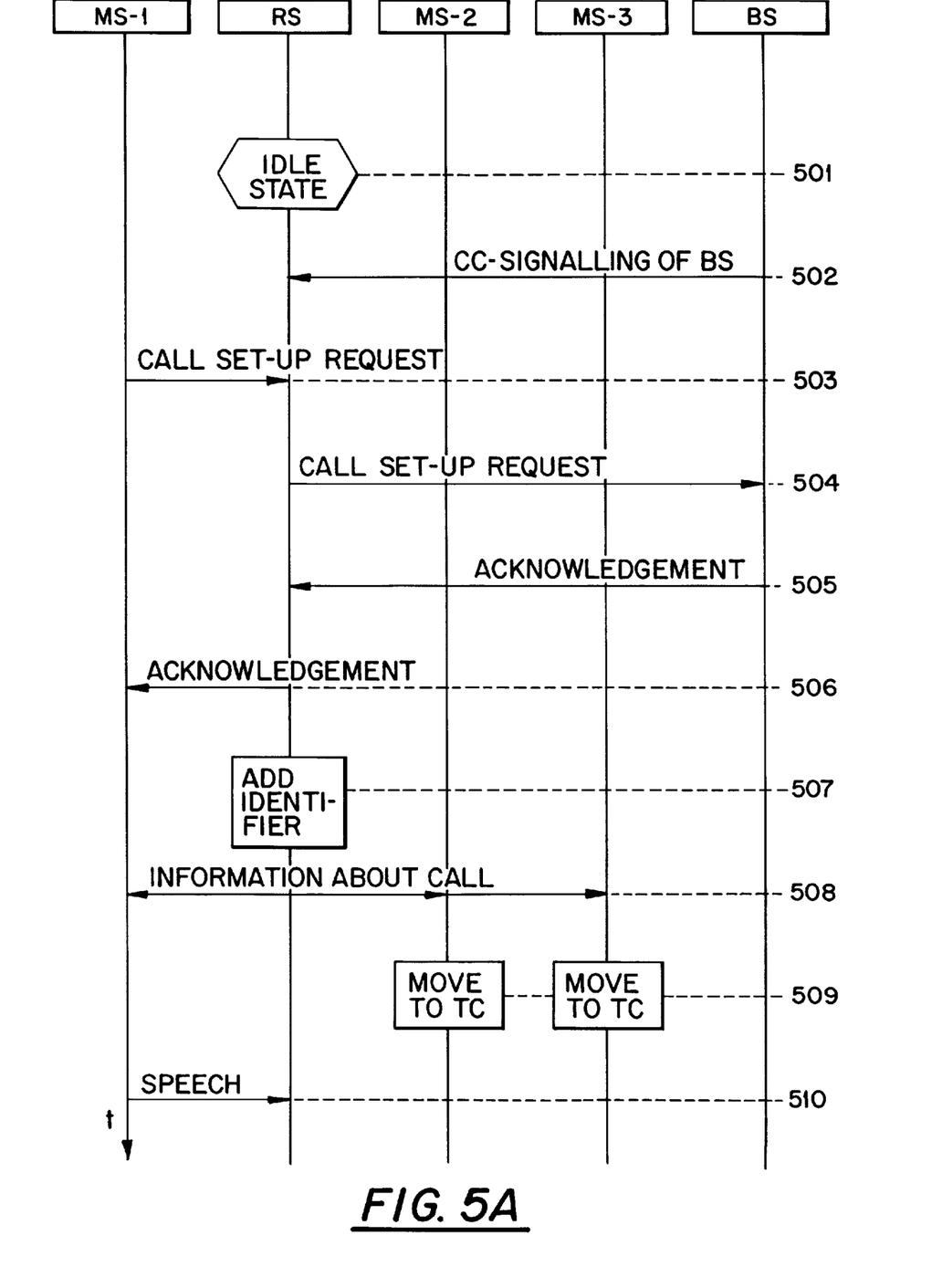
Figure 5B:
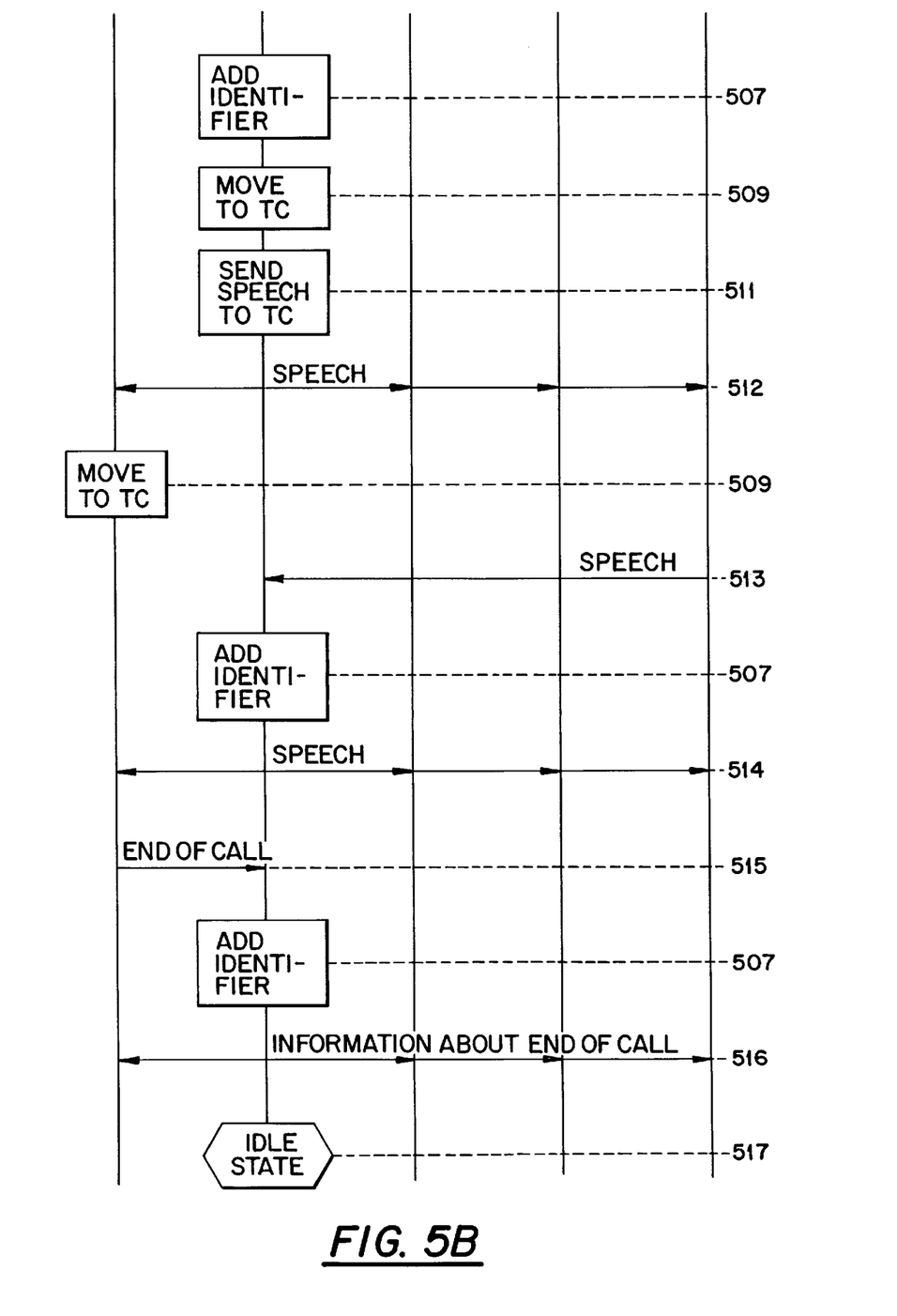
Figure 6A:
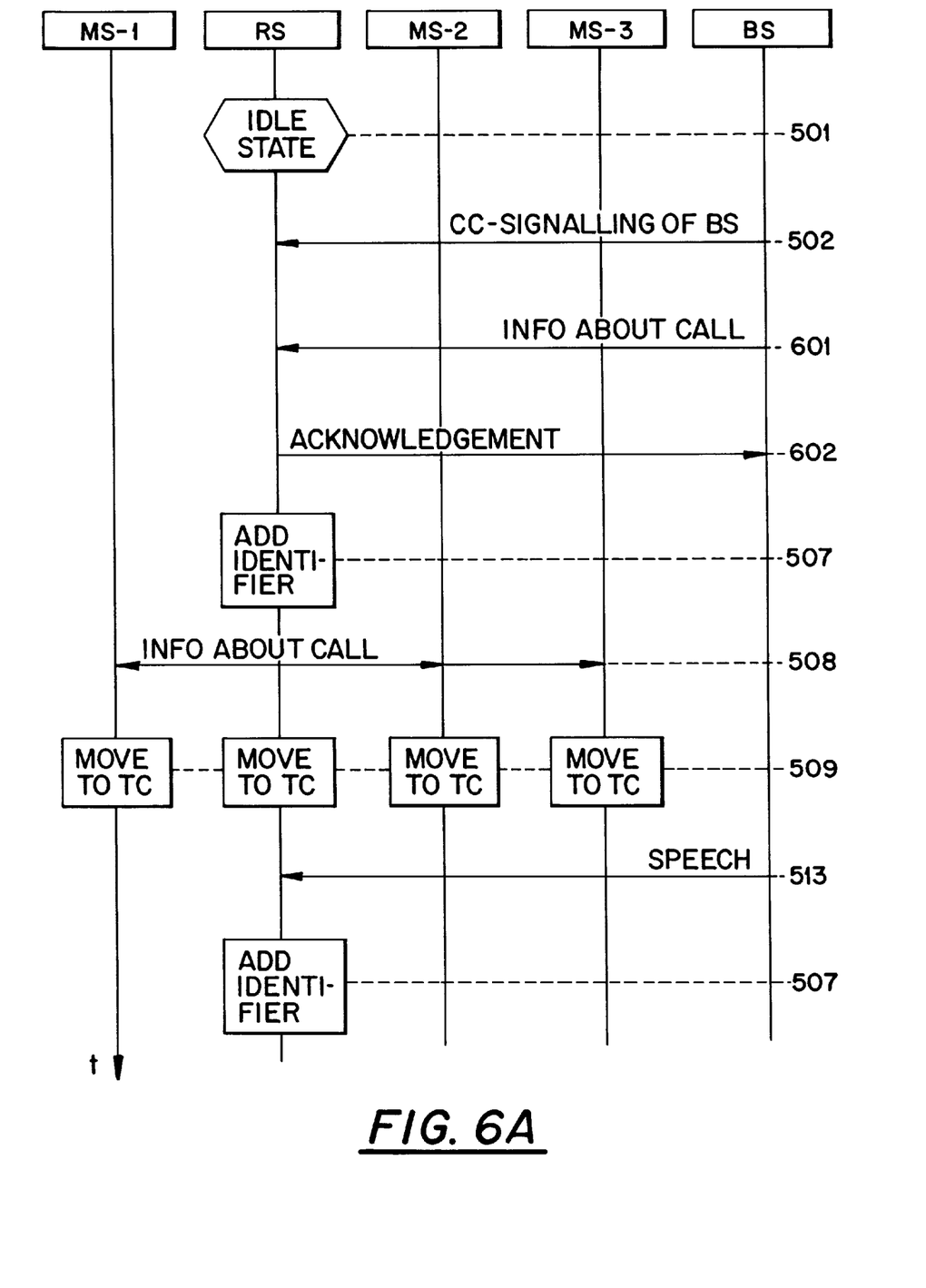
Figure 6B:
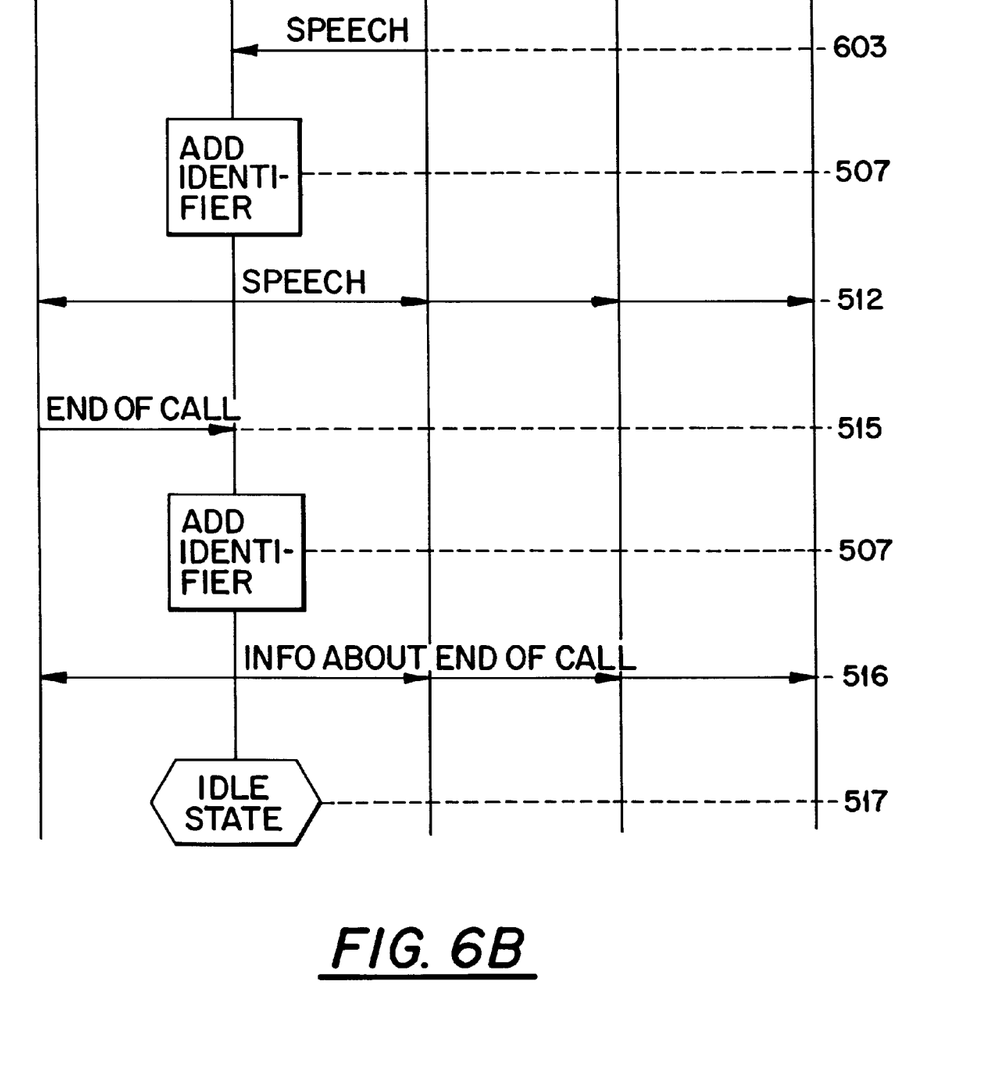

FIGS. 5 and 6 illustrate communication between the mobile stations and the network elements of the mobile communication network, and functions performed by the network elements. The figures show a base station BS, a repeater station RS, and mobile stations MS1, MS2 and MS3 of the mobile communication system. The messages, commands and requests sent by the network elements or the mobile stations are indicated by arrows in the figures, and the functions performed by the network elements are indicated by blocks.

FIGS. 5A and 5B show a signalling and a functional diagram of a method according to a first embodiment of the invention in the uplink direction. FIG. 5A shows the method first in idle state 501, after which the base station BS transmits 502 normal signalling on its control channel to the mobile stations located within its coverage area and to the repeater station RS. This may be repeated several times. The actual implementation of the method according to the invention starts with a call set-up request 503 sent by a first mobile station MS1 communicating on a direct mode channel, the request being received and forwarded 504 by the repeater station RS such that the base station BS is able to receive it. The base station BS and the network infrastructure represented by it acknowledge 505 the call set-up request, and the repeater station RS forwards 506 the acknowledgement of the received call set-up request to the mobile station MS1 that requested the call. The acknowledgement is also used for notifying the repeater station RS of the call to be established and the channel allocated for the call. The repeater station RS then sends 508 the information about the call to the mobile stations located on the direct mode channel, i.e. listening to the downlink channel of the direct mode channel, commands the mobile stations to move to the uplink frequency of a desired traffic channel, and adds 507 its own identifier to the information. Having been notified of the call, mobile stations MS2 and MS3 switch over 509 to a desired traffic channel, starting to listen to it, and a first mobile station MS1 starts transmitting 510 at the uplink frequency of the direct mode channel.

The embodiment continues in FIG. 5B, in which the repeater station RS receives the speech or other transmission from the mobile station, adds 507 its own identifier thereto, switches 509 its transmitter to the uplink frequency of the traffic channel, and repeats 511 the transmission of the mobile station at the uplink frequency of the traffic channel, which the other mobile stations, i.e. MS2 and MS3, listen to. The transmission of the first mobile station is thereby forwarded 512 to the second MS2 and third MS3 mobile stations at the uplink frequency of the traffic channel and, via the same frequency, also to the base station BS of the mobile communication system for forwarding elsewhere in the system. When one wants to send transmissions from the base station BS to the first mobile station MS1, the base station BS sends the mobile station a command 509 via the repeater station to switch over to the uplink frequency of a desired traffic channel to listen to a transmission 513 of the base station BS forwarded by the repeater station RS. The repeater station receives the transmission 513 from the base station, adds 507 its own identifier thereto, and forwards 514 the transmission of the base station at the uplink frequency of the traffic channel, which the mobile stations, including the first mobile station MS1, listen to. As the first mobile station MS1 terminates the call, it notifies 515 the repeater station of the matter on the uplink channel of the direct mode channel. The repeater station adds 507 its own identifier to the end-of-call notification, and repeats 516 the notification at the uplink frequency of the traffic channel. After this, the method is restored to idle state.

FIGS. 6A and 6B show a signalling and a functional diagram of a method according to a second embodiment of the invention in the downlink direction. In this embodiment, steps 501 and 502 of the above-described first embodiment are first carried out, whereafter the implementation of the invention will start as the base station sends a call set-up request 601 to the repeater station RS. The call set-up request comprises information about the call to be established, in which even mobile stations from the direct mode channel maintained by the repeater station are to participate. After this, the repeater station RS acknowledges 602 the reception of the call set-up request to the base station BS. The second embodiment of the invention then continues as described in steps 507, 508, 509, 513 and 512 of the first embodiment. These steps are described above in connection with the description of the first embodiment. FIG. 6A illustrates the implementation of the method until step 507, and FIG. 6B illustrates the rest of the method. After step 512, the second mobile station MS2 sends its own transmission 603, such as a speech item, on the uplink channel of the direct mode channel to the repeater station RS, which adds its own identifier thereto in accordance with step 507. After this, the second embodiment continues as described in steps 512, 515, 507, 516 and 517 above.

The drawings and the description thereof are only intended to illustrate the idea of the invention. The claimed method, mobile communication system and mobile station for establishing a telecommunications connection may vary in their details within the scope of the claims. Although the invention is described above mainly in connection with mobile telephone systems, the invention can also be used in other kinds of mobile communication systems.

I claim:

1. A method for establishing a telecommunications connection in a mobile communication system which has a base station, a plurality of mobile stations arranged for communicating with the base station at a respective uplink frequency and a respective downlink frequency of respective control and traffic channels of the base station, at least a first and a second mobile station arranged for communicating on a direct mode channel that comprises an uplink channel and a downlink channel, these first and second mobile stations arranged for communicating on the direct mode channel having respective memories, a repeater station arranged to relay traffic between the mobile stations arranged for communicating on the direct mode channel and the base station; comprising the steps of:

the repeater station listening to a downlink frequency of a control channel of the base station and the uplink channel of the direct mode channel;

a first said mobile station arranged for communicating on said direct mode channel sending a call set-up request to the repeater station on the uplink channel of the direct mode channel;

the repeater station transmitting the call set-up request to the base station;

in response to receiving the call set-up request, the base station commanding the repeater station to move to a specific traffic channel from any said traffic channels of the base station;

the repeater station using the downlink channel of the direct mode channel to command the mobile stations arranged for communicating on the direct mode channel, via a command, to switch-over to the uplink frequency of said specific traffic channel and start listening to said specific traffic channel;

the repeater station moving itself to the downlink frequency of said specific traffic channel and starting to listen to said specific traffic channel;

in response to receiving said command of the repeater station, said first and second mobile stations arranged for communicating on the direct mode channel storing information about said specific traffic channel in the respective memories thereof and moving to the uplink channel of the direct mode channel for sending a transmission to the repeater station and to the uplink frequency of said specific traffic channel for listening to transmissions forwarded by the repeater station;

the repeater station forwarding a transmission received from the base station to said first and second mobile stations at the uplink frequency of said specific traffic channel; and the repeater station using the uplink frequency of said specific traffic channel to forward transmissions transmitted by said first and second mobile stations on the direct mode channel, to the base station and to said mobile stations which are listening to the uplink frequency of said specific traffic channel.

2. A method according to claim 1, wherein:

having received the command of the repeater station to move to the uplink frequency of said specific traffic channel and start listening to said specific traffic channel, a respective said mobile station adding information about said specific traffic channel to a transmission of said respective mobile station, upon sending this transmission on the uplink channel of the direct mode channel, and, in response to receiving said information about said specific traffic channel a third mobile station, having later tuned to the uplink channel of the direct mode channel, moving to the uplink frequency of said specific traffic channel, starting to listen to said specific traffic channel.

3. A method according to claim 1, wherein:

the repeater station, in forwarding said transmission received from the base station at the uplink frequency of said specific traffic channel, adding an identifier of said repeater station to the respective said transmission of the base station, and on the basis of the identifier of said repeater station the base station becoming knowledgeable that a respective transmission received by the base station at the uplink frequency of said specific traffic channel comes from the repeater station, and, in response to thereby becoming knowledgeable, the base station not forwarding the respective said transmission to said mobile communication system.

4. A method according to claim 1, wherein:

the repeater station, in response to receiving a transmission sent by the base station, forming a new transmission by adding thereto an identifier that contains information about direct mode transmission and a transmission received from said first mobile station on the direct mode channel, and sending said new transmission at the uplink frequency of said specific traffic channel to the base station for forwarding to said mobile communication.

5. A method according to claim 1, further comprising:

the repeater station, in terminating a transmission at the uplink frequency of said specific traffic channel, sending a command at the uplink frequency of said specific traffic channel to said mobile stations arranged for communicating on said direct mode channel, instructing these mobile stations to move to the direct mode channel and to start listening to said direct mode channel.

6. A method for establishing a telecommunications connection in a mobile communication system which has a base station, a plurality of mobile stations arranged for communicating with the base station at a respective uplink frequency and a respective downlink frequency of respective control and traffic channels of the base station, at least a first and a second mobile station arranged for communicating on a direct mode channel that comprises an uplink channel and a downlink channel, a repeater station arranged to relay traffic between the mobile stations arranged for communicating on the direct mode channel and the base station, comprising the steps of:

the repeater station listening to a downlink frequency of a control channel of the base station and the uplink channel of the direct mode channel;

the base station sending a call set-up request, for setting up a call to be established, to the repeater station, requesting at least said first mobile station to participate in the call to be established and notifying the repeater station of a specific traffic channel allocated for the call from among said traffic channels of the base station;

the repeater station using the downlink channel of the direct mode channel to command said mobile stations arranged for communicating on the direct mode channel, via a command, to switch over to the uplink frequency of said specific traffic channel and to start listening to said specific traffic channel;

said repeater station moving itself to the downlink frequency of said specific traffic channel, starting to listen to said specific traffic channel;

in response to receiving said command of the repeater station, said first and second mobile stations arranged for communicating on the direct mode channel storing information about said specific traffic channel in the respective memories thereof and moving to the uplink channel of the direct mode channel for sending a transmission to the repeater station and to the uplink frequency of said specific traffic channel for listening to transmissions forwarded by the repeater station;

the repeater station forwarding a transmission received from the base station to said first and second mobile stations at the uplink frequency of said specific traffic channel;

the repeater station using the uplink frequency of said specific traffic channel to forward transmissions transmitted by said first and second mobile stations on the direct mode channel, to the base station and to said mobile stations which are listening to the uplink frequency of said specific traffic channel.

7. A method according to claim 6, wherein:

having received the command of the repeater station to move to the uplink frequency of said specific traffic channel and start listening to said specific traffic channel, a respective said mobile station adding information about said specific traffic channel to transmission of said respective mobile station upon sending this transmission on the uplink channel of the direct mode channel, and, in response to receiving said information about said specific traffic channel, a third mobile station, having later tuned to the uplink channel of the direct mode channel, moving to the uplink frequency of said specific traffic channel, starting to listening to said specific traffic channel.

8. A method according to claim 6, wherein:

the repeater station, in forwarding said transmission received from the base station at the uplink frequency of said specific traffic channel, adding an identifier of said repeater station to the respective said transmission of the base station, and one the basis of the identifier of said repeater station the base station becoming knowledgeable that a respective transmission received at the uplink frequency of said specific traffic channel comes from the repeater station, and, in response to thereby becoming knowledgeable, the base station not forwarding the respective said transmission to said mobile communication system.

9. A method according to claim 6, wherein:

the repeater station, in response to receiving a transmission sent by the base station, forming a new transmission by adding thereto an identifier that contains information about direct mode transmission and a transmission received from said first mobile station on the direct mode channel, and sending said new transmission at the uplink frequency of said specific traffic channel to said base station for forwarding to said mobile communication system.

10. A method according to claim 6, further comprising:

the repeater station, in terminating a transmission at the uplink frequency of said specific traffic channel, sending a command at the uplink frequency of said specific traffic channel to said mobile stations arranged for communicating on said direct mode channel, instructing these mobile station to move to the direct mode channel and to start listening to said direct mode channel.

11. A mobile communication system comprising:

a base station having control and traffic channels each comprising an uplink frequency and a downlink frequency;

at least a first and a second mobile station arranged for communicating on a direct mode channel that comprises an uplink channel and a downlink channel; and a repeater station arranged for transmitting traffic between the mobile stations communicating on the direct mode channel and the base station;

the repeater station comprising:

a first receiver unit arranged for receiving radio messages from the base station;

a second receiver unit arranged for receiving radio messages from mobile stations communicating on the uplink frequency of the direct mode channel;

a control unit arranged for controlling the operation of said first and second receiver units and the repeater station, and only a single transmitter unit, arranged for transmitting radio messages in response to commands of said control unit, to the base station and a mobile station listening to an uplink frequency of a traffic channel of the base station, or to a mobile station from among said mobile stations arranged communicating on the direct mode channel.

12. A mobile communication system according to claim 11, wherein the repeater station further comprises:

means for forwarding to the base station a call set-up request transmitted by a said mobile station communicating on the direct mode channel, the repeater station being arranged to be commanded, in response to receipt by the base station of the call set-up request, to move to a specific said traffic channel.

13. A mobile communication system according to claim 12, wherein the repeater station further comprises:

means for commanding the mobile stations communicating on the direct mode channel to switch over to the uplink frequency of said specific traffic channel to listen to the transmissions of the repeater station;

means for moving the repeater station to the downlink frequency of said specific traffic channel to listen to said specific traffic channel;

means for moving the repeater station to the uplink channel of the direct mode channel to listen to said uplink channel; and a switch for switching the repeater station to transmit either on the downlink channel of the direct mode channel or at the uplink frequency of said specific traffic channel, for sending a downlink transmission of the traffic channel as an uplink transmission of the traffic channel, and for adding a transmission received on the uplink channel of the direct mode channel to an uplink transmission of said specific traffic channel as sent by the repeater station.

14. A mobile communication system according to claim 11, wherein the repeater station further comprises:

means for commanding the mobile stations communicating on the direct mode channel to switch over to the uplink frequency of a specific said traffic channel to listen to the transmissions of the repeater station;

means for moving the repeater station to the downlink frequency of said specific traffic channel to listen to said specific traffic channel;

means for moving the repeater station to the uplink channel of the direct mode channel to listen to said uplink channel; and a switch for switching the repeater station to transmit either on the downlink channel of the direct mode channel or at the uplink frequency of said specific traffic channel, for sending a downlink transmission of the traffic channel as an uplink transmission of the traffic channel, and for adding a transmission received on the uplink channel of the direct mode channel to an uplink transmission on said specific traffic channel as sent by the repeater station.

15. A mobile station adapted to communicate with another mobile station and with a repeater station on a direct mode channel having an uplink channel and a downlink channel, the repeater station further arranged to communicate with a base station on a traffic channel having an uplink frequency and a downlink frequency, said mobile station comprising:

a memory;

a transceiver, capable of communicating on the direct mode channel;

a controller for controlling the operation of said mobile station;

switching means, which are arranged to be responsive to a command sent by the repeater station, for moving said transceiver of said mobile station to listen to a repeater station transmission on an uplink frequency of a traffic channel specified in said command sent by said repeater station, the repeater station transmission on said uplink frequency of said traffic channel including a relay of a signal received by said repeater station from said base station on said downlink frequency of said traffic channel.

16. A mobile station according to claim 15, further comprising:

means for containing information about said specific traffic channel in a transmission of the mobile station, so that in response to receiving said transmission of said mobile station and said information contained therein, any third mobile stations that later tune to the uplink channel of the direct mode channel will be caused to switch over to the uplink frequency of said specific traffic channel and to start to listen to said specific traffic channel.

* * * * *